(12) United States Patent
Falk et al.

(10) Patent No.: US 7,729,014 B2
(45) Date of Patent: Jun. 1, 2010

(54) SYSTEMS FOR GRAY COMPONENT REPLACEMENT BLENDING

(75) Inventors: Richard Falk, San Rafael, CA (US); Jonathan B. Marsden, San Mateo, CA (US)

(73) Assignee: Electronics For Imaging, Inc., Foster City, CA (US)

( * ) Notice: Subject to any disclaimer, the term of this patent is extended or adjusted under 35 U.S.C. 154(b) by 347 days.

(21) Appl. No.: 11/840,926

(22) Filed: Aug. 17, 2007

(65) Prior Publication Data

US 2007/0285726 A1 Dec. 13, 2007

Related U.S. Application Data

(63) Continuation of application No. 10/324,771, filed on Dec. 19, 2002, now Pat. No. 7,259,893.

(51) Int. Cl.
H04N 1/40 (2006.01)
(52) U.S. Cl. .......................... 358/2.1; 358/529
(58) Field of Classification Search ............... 358/2.1, 358/1.9, 3.27, 500, 504, 529, 520; 382/162, 382/167
See application file for complete search history.

(56) References Cited

U.S. PATENT DOCUMENTS

| | | | |
|---|---|---|---|
| 5,331,438 A | 7/1994 | Harrington | |
| 5,402,253 A | 3/1995 | Seki | |
| 5,459,590 A | 10/1995 | Bleker et al. | |
| 5,719,956 A | 2/1998 | Ogatsu et al. | |
| 5,917,994 A | 6/1999 | Perumal, Jr. et al. | |
| 5,978,011 A | 11/1999 | Jacob et al. | |
| 5,982,993 A | 11/1999 | Slade | |
| 5,999,703 A | 12/1999 | Schwartz et al. | |
| 6,039,434 A | 3/2000 | Moroney | |
| 6,084,689 A | 7/2000 | Mo | |
| 6,137,596 A | 10/2000 | Decker et al. | |
| 6,169,609 B1 | 1/2001 | Jacob et al. | |
| 2003/0058211 A1 | 3/2003 | Kim et al. | |
| 2006/0197998 A1 | 9/2006 | Shibuya et al. | |

FOREIGN PATENT DOCUMENTS

JP 2003046808 A * 2/2003

* cited by examiner

*Primary Examiner*—Edward L Coles
*Assistant Examiner*—Stephen M Brinich
(74) *Attorney, Agent, or Firm*—Michael A. Glenn; Glenn Patent Group

(57) ABSTRACT

Color processing methods and apparatus are provided that blend the gray component replacement ("GCR") level of arbitrarily-specified input color data with an estimate of the GCR level of an output profile, and then converts processed device-independent data to output CMYK data that has a GCR level that substantially matches the GCR level of the input CMYK data. Methods and apparatus in accordance with this invention may be used to receive CMYK data that approximates a spot color, and provide tints of spot colors using an output profile that has a GCR level that differs from the GCR level of the input color data.

19 Claims, 3 Drawing Sheets

SYSTEMS FOR GRAY COMPONENT REPLACEMENT BLENDING

REFERENCE TO RELATED APPLICATIONS

This application is a continuation of U.S. patent application Ser. No. 10/324,771, filed 19 Dec. 2002, now U.S. Pat. No. 7,259,893.

BACKGROUND

The invention relates to color printing, and in particular, to apparatus and methods that smoothly transition between two colors that have a similar visual appearance but have different gray component replacement levels.

In digital printing, a hardcopy output typically is printed on a four-color device from a digital image. Examples of four-color devices include offset lithography in which the "four-color process" employs printing inks as colorants applied to paper by a printing press; gravure printing, which also employs printing inks applied to paper; off-press proofing systems, which employ toners as colorants to simulate the effect of an offset press; and computer-driven printers, which use a variety of technologies and colorants, such as inks, toners, and dyes, applied in various continuous-tone, half-tone, or dithered patterns. Most conventional four-color devices use three chromatic colorants, which are commonly chosen to be the subtractive primaries cyan, magenta, and yellow (commonly referred to collectively as "CMY"), and an achromatic, or black, colorant (commonly referred to as "K").

To print a digital image on a four-color device, it typically is necessary to convert colors between different device color spaces. For example, a color image that has been scanned on a color scanner typically is defined in terms of red, green and blue (collectively called "RGB") colorants. If the scanned image is to be viewed on a color monitor, the color image data typically must be converted from the color space of the scanner to the color space of the monitor. Moreover, if the scanned or displayed image also is to be printed on a CMYK color printer, the color image data must be converted from the color space of the scanner (or the monitor) to the color space of the printer. Thus, it typically is necessary to convert between the color spaces defined by the colors measured by the scanner, the RGB used by the monitor, and CMYK used by the printer.

To perform such conversions, previously known color management systems typically use output profiles to describe the calorimetric properties of devices. Each output profile commonly contains a forward transformations between a device-dependent color space and a device-independent color space, and a reverse transformation between a device-independent color space and a device-dependent color space. Thus, in the above example, a first output profile may be used to convert between the device-dependent color space of the scanner, and a device-independent color space. A second output profile may be used to convert between the device-independent color space and the device-dependent color space of the monitor, and a third output profile may be used to convert between the device-independent color space and the device-dependent color space of the CMYK printer.

A commonly-used device-independent color space is CIELAB, which was adopted by the Comission Internationale de l'Eclairage (International Commission on Illumination). Somewhere between the optical nerve and the brain, retinal color stimuli are translated into distinctions between light and dark, red and green, and blue and yellow. CIELAB indicates these values with three axes: $L^*$, $a^*$, and $b^*$. $L^*$ represents lightness, whose values run from 0 (black) to 100 (white). $a^*$ represents red-green color, and has values that run from positive (indicating amounts of red) to negative (indicating amounts of green). $b^*$ represents blue-yellow color and has values that run from positive (indicating amounts of yellow) to negative (indicating amounts of blue).

Most colors printed using a CMYK device may be printed with a variety of different combinations of CMYK colorants. That is, many combinations of CMYK values map to the same $L^*a^*b^*$ value and hence have the same visual color appearance. Specifically, most of the colors produced by the K component alone can be produced by a combination of CMY components. Therefore, for colors that contain non-zero CMY values for all three CMY components, one can reduce the amount of CMY and increase K to get the same color (unless K is already at its maximum of 100%). Likewise, for colors that contain non-zero K values, one can decrease the amount of K and increase the amount of CMY to get the same color (unless any of CMY are already at their maximum of 100%).

In general, these options can be thought of as different balances between the amount of K and the amount of a neutral combination of the primary colorants CMY. Because the printed colors theoretically appear identical, the choice among these options typically is made according to considerations of process control and repeatability, limits of the printing technology, cost, aesthetic taste, and the like. Some of the common approaches to the usage of K versus CMY are referred to in the art as Under-Color Removal ("UCR") and Gray-Component Replacement ("GCR").

Previously known techniques for generating output profiles typically include GCR level as one component in the process used to generate the profile. In particular, a set of test patches is printed on an output device, and the patches are measured with a colorimeter. The measured values and a desired GCR level then are used to determine the output profile for the printer. Although the output profile therefore has an implied GCR level, a typical user of the printing device (e.g., a graphic artist printing an image from a page layout program to the output device) typically does not know the GCR level that is implied in the output profile. Nevertheless, if the user seeks to carefully control the GCR level of the printed output, the implied GCR level of the printer's output profile may affect the user's ability to achieve a specific GCR level in the printed output.

Referring now to FIGS. 1 and 2, previously known color processing systems are described that illustrate this phenomenon. In particular, FIG. 1 illustrates previously-known color processing system 10, that includes first color converter 14, color processing module 16, and second color converter 18. First color converter 14 converts device-dependent color values to device-independent color values. The output of the first color converter is then provided to color processing module 16, which may include one or more modules that perform color processing in device-independent color space. Finally, second color converter 18 converts device-independent color values to device-dependent values for printing by printer.

One such previously known color processing system for editing spot colors is illustrated in FIG. 2. In particular, color processing system 10' includes output profile forward lookup table 14', tint module 16' and output profile reverse lookup table 18'. A spot color processing system, such as system 10', typically permits a user to specify colors in a CMYK color space. Spot colors are colors that typically use specialized inks to produce colors that cannot be produced by conventional CMYK inks. Nevertheless, it often is useful to approximate such spot colors using CMYK inks, and therefore the ability to edit CMYK values that correspond to spot colors is a desirable feature. Spot colors, just like CMYK colors, may be specified as tints which are percentages of colorant. That is, if the solid spot color is 100%, spot color tints may be specified as percentages less than 100%. It is desirable that a color processing system that simulates spot colors by using CMYK values also should simulate spot color tints.

One approach to approximating spot color tints is to multiply the CMYK values for the solid (100%) spot color by the tint value (percentage). Thus, for example, a 30% spot color tint would have CMYK values that are 30% of those of the solid 100% spot color CMYK values. This approach is not very accurate, however, because the color balance of CMY going from 100% to 0% is not constant. As a result, merely applying a tint value (percentage) to CMYK values will result in an unintended hue shift. A better approach to approximating spot color tints is to convert the CMYK values to device-independent color values (such as L*a*b* values), and then scale the corresponding L*a*b* values, which generally does not result in a hue shift.

Thus, as shown in FIG. 2, output profile forward lookup table 14' converts input color values $CMYK_I$ to device-independent color values $L^*a^*b^*_I$. Tint Module 16' may include processes or apparatus that tint spot colors by scaling $L^*a^*b^*_I$ values. If tinting is performed in L*a*b* color space, however, the tinted colors ultimately must be converted back to CMYK space, such as by using output profile reverse lookup table 18'. Because the GCR level of the user-specified spot color typically differs from the GCR level implied by output profile reverse lookup table 18', $CMYK_O$ may appear calorimetrically similar to $CMYK_I$, but may have component values that substantially differ from $CMYK_I$ at 100%. Indeed, there are many more possible arbitrary CMYK colors that may be specified by a user compared to the specific subset of CMYK colors defined by output profile reverse lookup table 18'. As a result, the GCR level of $CMYK_O$ may substantially differ from the GCR level of $CMYK_I$, and the printed output colors may not actually appear as desired by the user.

It therefore would be desirable to provide color processing methods and apparatus that smoothly transition from an arbitrary CMYK color to the CMYK values as specified in the output profile of the system.

It further would be desirable to provide color processing methods and apparatus that estimate the GCR level of arbitrarily specified CMYK values and the implied GCR level of an output profile, and provide output CMYK values that are based on a blend of the estimated GCR levels.

It still further would be desirable to provide color processing methods and apparatus that provide CMYK values that approximate tints of spot colors, and that are based on a blend of the estimated GCR level of user-specified CMYK values that approximate the spot color, and the implied GCR level of an output profile.

SUMMARY OF THE INVENTION

In view of the foregoing, it is an object of this invention to provide color processing methods and apparatus that smoothly transition from an arbitrary CMYK color to the CMYK values as specified in the output profile of the system.

It further is an object of this invention to provide color processing methods and apparatus that estimate the GCR level of arbitrarily specified CMYK values and the implied GCR level of an output profile, and provide output CMYK values that are based on a blend of the estimated GCR levels.

It still further is an object of this invention to provide color processing methods and apparatus that provide CMYK values that approximate tints of spot colors, and that are based on a blend of the estimated GCR level of user-specified CMYK values that approximate the spot color, and the implied GCR level of an output profile.

These and other objects of this invention are accomplished by providing color processing methods and apparatus that receive arbitrarily-specified input CMYK values, convert the input CMYK values to device-independent color space and process the input data in that space, estimate the GCR level of the input CMYK values, estimate the GCR level of an output profile, blend the GCR level estimates, and then convert the processed device-independent data to output CMYK data that has a GCR level that substantially matches the GCR level of the input CMYK data. More particularly, this invention provides methods and apparatus for receiving CMYK values that approximate a spot color, tint the input color data in a device-independent color space, and then provide output CMYK values that approximate tints of spot colors and that have a GCR level that is a blend on the GCR levels of input CMYK values and the implied GCR level of an output profile.

Other aspects and advantages of the invention will become apparent from the following detailed description in combination with the accompanying drawings, illustrating, by way of example, the principles of the invention.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which.

DETAILED DESCRIPTION

This invention provides color processing methods and apparatus that receive arbitrarily-specified input CMYK values, color process the data in a device-independent color space, and then provide output CMYK data that has a GCR level that substantially matches the GCR level of the input CMYK data. More particularly, this invention provides methods and apparatus for receiving CMYK values that approximate a spot color, tint the input color data in a device-independent color space, and then provide output CMYK values that approximate tints of spot colors and that have a GCR level that is a blend on the GCR levels of input CMYK values and the implied GCR level of an output profile. Methods in accordance with this invention may be implemented in the form of computer-executable instructions, such as software modules, that may be executed by a computer device. Such software modules may include routines, programs, objects, components, data structures, etc. that perform tasks or implement particular abstract data types. Persons of ordinary skill in the art will understand that at least some aspects of this invention may be practiced using personal computers, microprocessor-based computers, multiprocessor systems, network computers, servers, minicomputers, set top boxes, mainframe computers, and other suitable computer systems. In addition, at least some aspects of this invention may be practiced in distributed computing environments in which task are performed by remote processing devices linked via a communications network.

Figure 1:
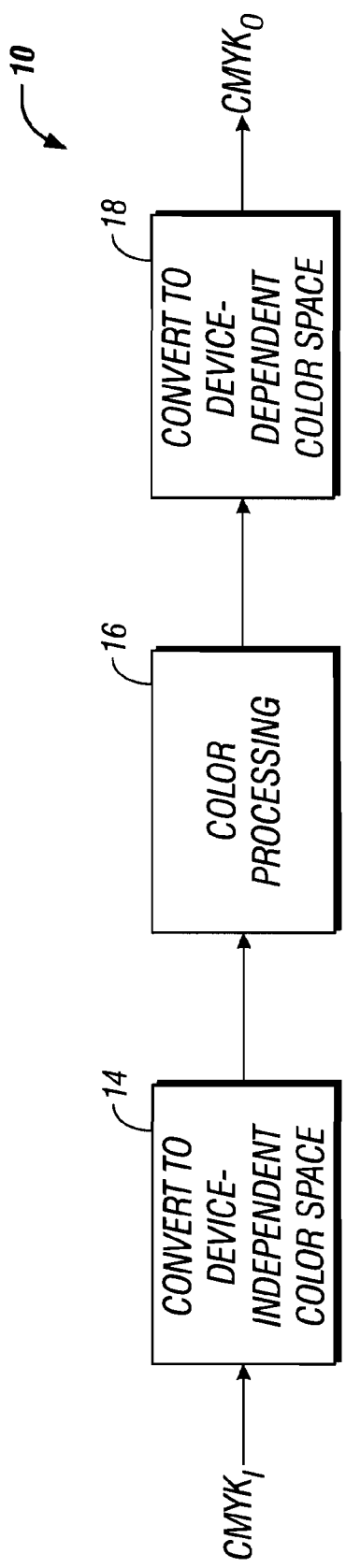
FIG. 1 is a block diagram of a previously known color processing method.
Figure 2:
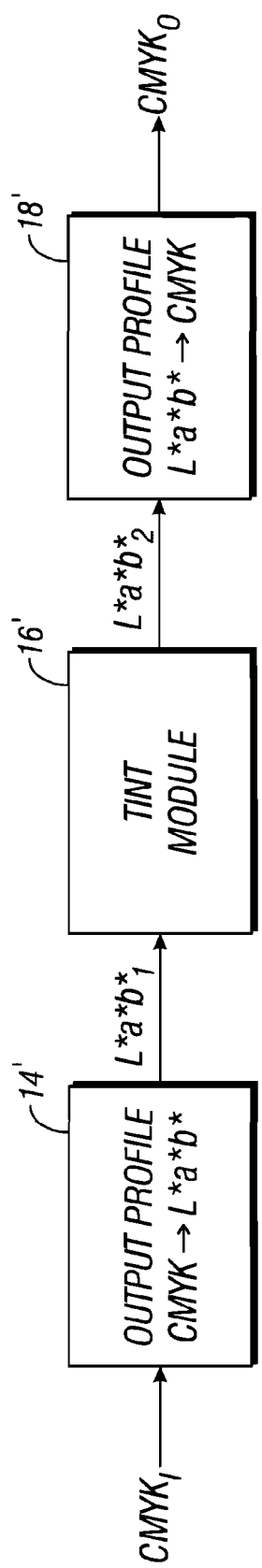
FIG. 2 is a block diagram of a previously known color processing apparatus that provides tints.
Figure 3:
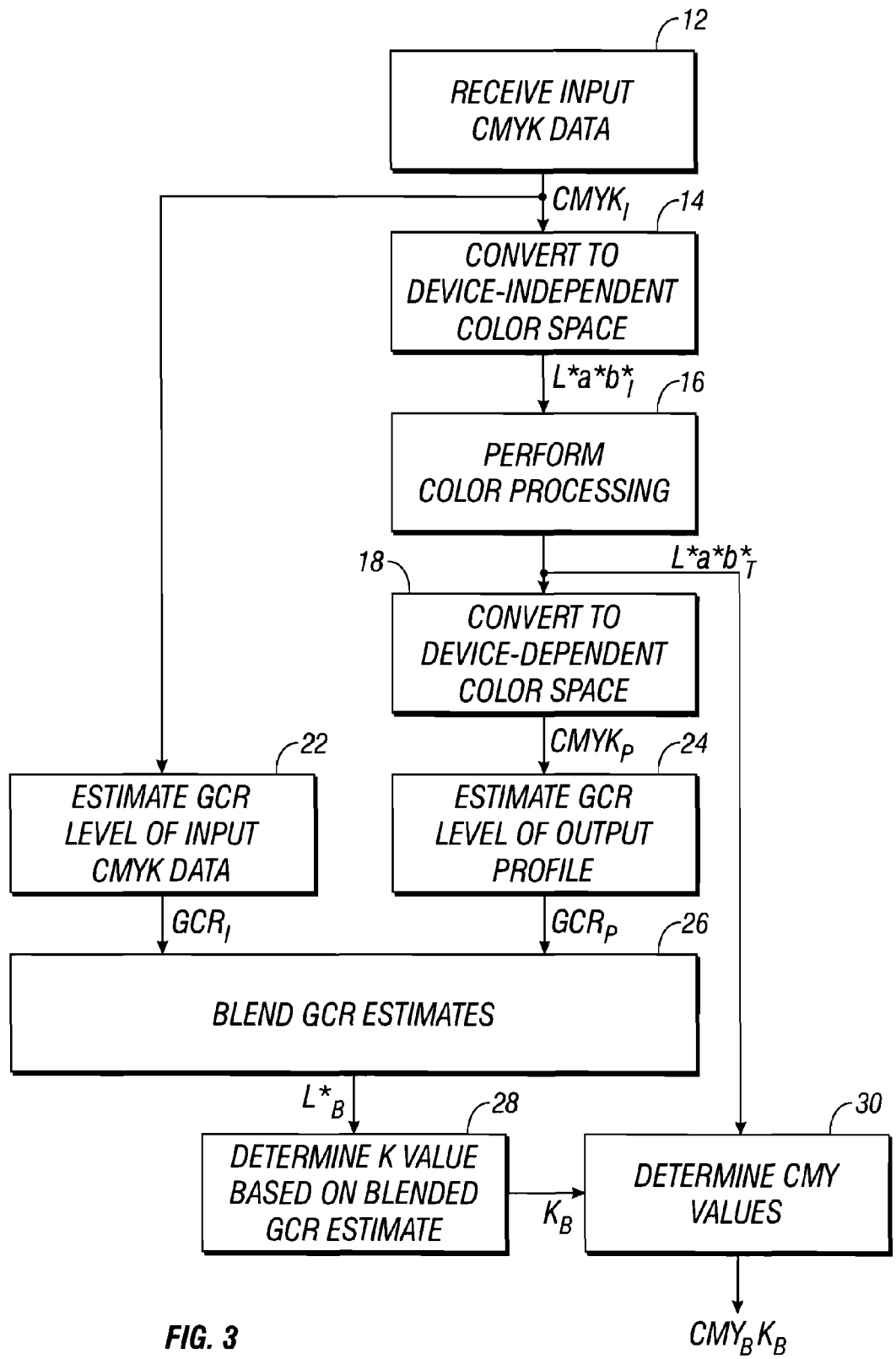
FIG. 3 is an exemplary method for providing CMYK values with a blended GCR level in accordance with this invention.

Referring now to FIG. 3, an illustrative method in accordance with this invention is described. At step 12, input color data $CMYK_I$ is received. Input color data $CMYK_I$ may be provided, for example, by a user via a graphics arts software application, the output of an output profile, or any other source of color data. At step 14, input color data $CMYK_I$ are converted to a device-independent color space, such as CIELAB, CIEXYZ, calibrated RGB, or any other similar device-independent color space. This conversion may be performed using any conventional technique for converting device-dependent color data to device-independent color data. For example, step 14 may be implemented using a forward lookup table of a printer output profile. As shown in FIG. 3, input color data $CMYK_I$ are converted to CIELAB values $L*a*b*_I$.

Next, at step 16, the input color data are processed in device-independent color space to provide processed color data $L*a*b*_T$. Such color processing may include one or more conventional color processing steps, such as tinting, gamut mapping, or any other conventional color processing functions. At step 18, processed color data $L*a*b*_T$ are converted to device-dependent color data $CMYK_P$. This conversion step may be performed using any conventional technique for converting data from device-independent color space to device-dependent color space. For example, step 18 may be implemented using a reverse lookup table of a printer output profile.

Although the GCR level of input data $CMYK_I$ may be known (for example, when a user specifies the GCR level), the GCR level of processed output $CMYK_P$ typically will not be known. For example, if $CMYK_P$ is generated using a printer output profile, the GCR level of the output profile typically will not be known. Further, in many instances the GCR level of $CMYK_I$ also may not be known. Thus, at steps 22 and 24, the GCR levels of input color data $CMYK_I$ and processed color data $CMYK_P$ are estimated as $GCR_I$ and $GCR_P$, respectively. GCR estimation may be performed using any suitable technique or formula for estimating the GCR level of CMYK data. As described in more detail below, one exemplary method for estimating the GCR level of CMYK data uses the corresponding lightness (L*) value of the black-only component K of CMYK data as a proxy for GCR level.

Referring again to FIG. 3, at step 26 GCR estimates $GCR_I$ and $GCR_P$ are combined or blended to produce $GCR_B$. Any suitable technique for blending the GCR estimates may be used at this stage, such as linear or nonlinear combinations of $GCR_I$ and $GCR_P$. As described in more detail below, the blending function may be empirically derived based on other processing requirements. Next, at step 28, the black component $K_B$ that corresponds to $GCR_B$ is determined. In particular, an inverse of the formula or technique used in steps 22 and 24 to determine GCR level based on K-value is used to determine $K_B$ based on $GCR_B$. As described in more detail below, one exemplary method for determining $K_B$ is based on blended lightness (L*)values. Finally, at step 30, black component $K_B$ and processed color data $L*a*b*_T$ are used to determine CMY values that, when combined with $K_B$, provide output color data $CMY_B K_B$ that substantially matches the GCR level of $CMYK_I$.

Figure 4:
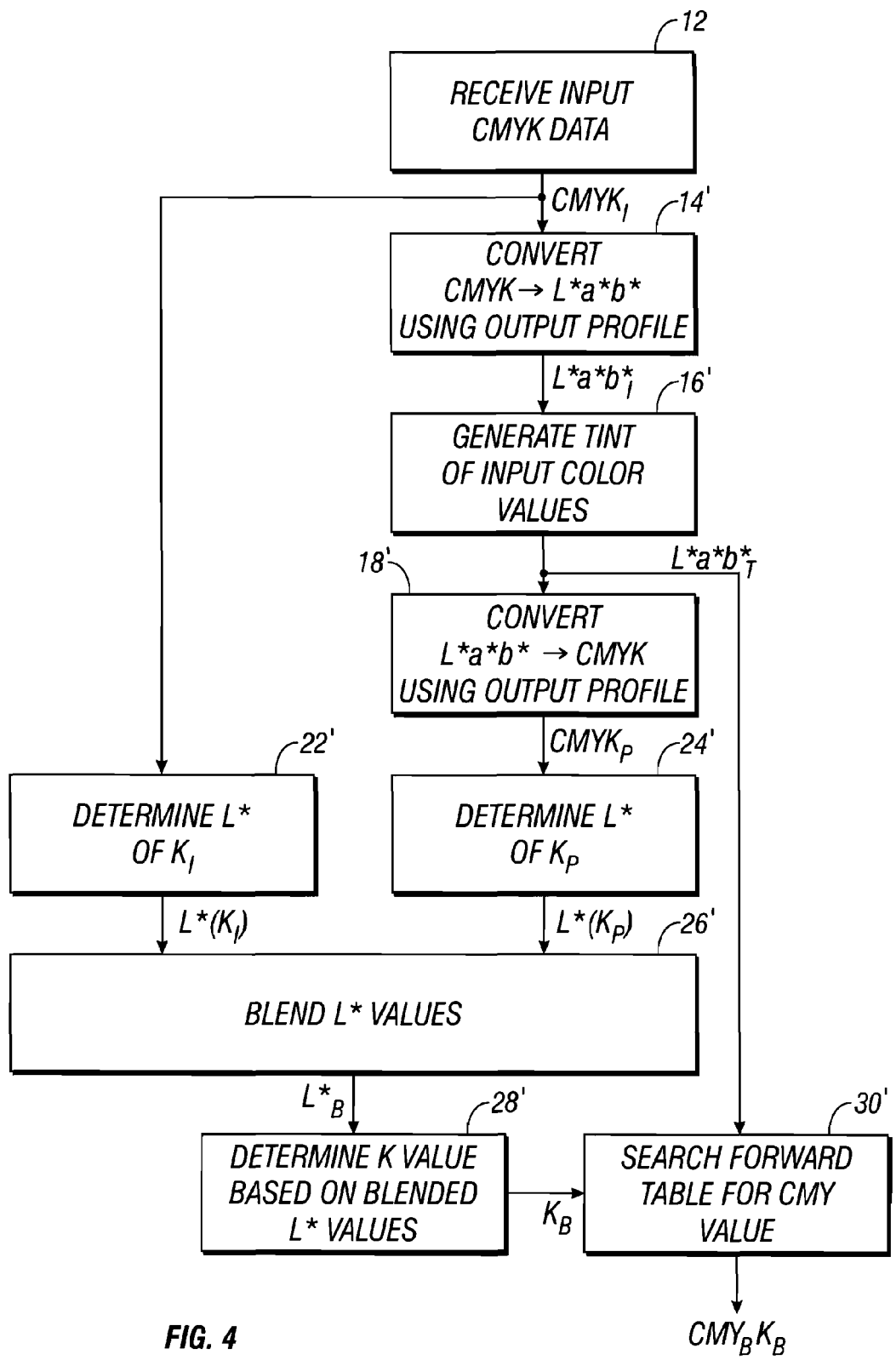
FIG. 4 is an alternative exemplary method for providing CMYK values that approximate tints of spot colors in accordance with this invention.

As described above, some previously known color processing systems allow a user to provide CMYK values that approximate spot colors. As further described above, it is often desirable in such color processing systems to produce CMYK values that approximate tints of spot colors. Referring now to FIG. 4, an exemplary embodiment of a spot color tinting process in accordance with this invention is described. At step 12, input color data $CMYK_I$ that approximates a spot color is received. $CMYK_I$ may be provided, for example, by a user via a user interface in a color processing software application. Alternatively, $CMYK_I$ may be provided by any other similar method for providing CMKY values that approximate a spot color.

Next, at step 14', $CMYK_I$ data are converted to device-independent color data $L*a*b*_I$ using an output profile of the printer that will be used to print the tinted spot colors. In particular, the output profile typically includes a forward lookup table that converts device-dependent color data (e.g., CMYK data) to device-independent color data (e.g., L*a*b* data), and a reverse lookup table that converts device-independent color data (e.g., L*a*b* data) to device-dependent color data (e.g., CMYK data). Thus, at step 14', the forward lookup table is used to convert $CMYK_I$ to data $L*a*b*_I$.

Next, at step 16', a tinted spot color is created in device-independent color space. That is, a tinted spot color is created by scaling $L*a*b*_I$. An exemplary technique for providing a tinted spot color uses the following formula:

$$L*a*b*_T = T \times (L*a*b*_I) + (1-T) \times (L*a*b*_{MAX}) \quad (1)$$

where $L*a*b*_T$ are the L*a*b* values of the tinted spot color, T is the desired tint level (T=1.0 (100%) to 0.0 (0%)), and $L*a*b*_{MAX}$ are the L*a*b* values from the forward lookup table of the output profile that corresponds to CMYK=(0,0,0,0). Note that the formula of Equation (1) merely illustrates one exemplary technique for tinting L*a*b* data. Persons of ordinary skill in the art will understand that any other similar technique for generating tints may be used. Also note that the formula of Equation (1) may be used to generate one or more tint values $L*a*b*_T$ that correspond to one or more tint levels $0 \leq T \leq 1$.

Next, at step 18', tint values $L*a*b*_T$ are converted to device-dependent color data $CMYK_P$ using the reverse lookup table of the printer's output profile. At steps 22' and 24', the GCR levels of input color data $CMYK_I$ and tint color data $CMYK_P$ are estimated. In particular, the corresponding lightness (L*) value of the black-only component K of CMYK data is used as a proxy for GCR level. Thus, at step 22', the L*a*b* values corresponding to $(0,0,0,K_I)$ are determined from the forward lookup table of the output profile, and the L* value is extracted as $L*(K_I)$. Similarly, at step 24', the L*a*b* values corresponding to $(0,0,0,K_P)$ are determined from the forward lookup table of the output profile, and the L* value is extracted as $L*(K_P)$.

Next, at step 26', lightness values $L*(K_I)$ and $L*(K_P)$ are combined or blended to provided blended lightness value $L*_B$. The lightness values may be blended using any suitable linear or non-linear formula for combining $L*(K_I)$ and $L*(K_P)$. For example, a formula for combining $L*(K_I)$ and $L*(K_P)$ may be determined empirically by printing of test patches using various blending formulas, and selecting the formula that produces the most desirable results. For the case of tinting spot colors, the following exemplary blending formulas produce good results:

$$L*_B = s^b \times (L*(K_I)) + (1-T) \times (L*_{MAX}) + (1-s^b) \times (L*(K_P)) \quad (2)$$

$$s = T - a \times (1-T), \text{ clipped so that } 0 \leq s \leq 1 \quad (3)$$

where T is the desired tint level (T=1.0 (100%) to 0.0 (0%)), a is an offset value, b is a power function, and $L_{MAX}$ is the L* value of the L*a*b* values from the forward lookup table of the output profile that corresponds to CMYK=(0,0,0,0). Exemplary values for a and b are a=0.2 and b=2. Persons of ordinary skill in the art will understand that blending functions other than those described by Equations (2) and (3) may be used, and that other values may be used for variables a and b.

Referring again to FIG. 4, at step 28', the black-only component $K_B$ that corresponds to $L^*_B$ is determined. In particular, the CMYK values that correspond to $(L^*_B,0,0)$ are determined from the reverse lookup table of the output profile, and the black value is extracted as $K_B$. Finally, at step 30, black component $K_B$ and tint color data $L^*a^*b^*_T$ are used to determine CMY values that, when combined with $K_B$, provide output color data $CMY_BK_B$ that has a GCR level that substantially matches the GCR level of $CMYK_T$. In particular, using the forward lookup table of the output profile, and fixing the K-value to $K_B$, the lookup table is searched to find the CMY values that convert to L*a*b* values that substantially match $L^*a^*b^*_T$. Persons of ordinary skill in the art will understand that steps 16' through 30' may be repeated for multiple tint color values $L^*a^*b^*_T$ to produce multiple output color values $CMY_BK_B$ in accordance with this invention.

Persons of ordinary skill in the art will understand that methods in accordance with this invention may be implemented in hardware or software, or any combination of hardware and software in accordance with well-known techniques. Exemplary apparatus for implementing at least some aspects of this invention include a general purpose computing device, such as a personal computer, and a special purpose computing device, such as a controller for digital printers and digital copiers. Such computing devices may include a computer memory such as read only memory, hard disk, magnetic disk, optical disk, or other suitable memory that may be used to store software modules and other data, such as lookup tables, used to implement methods of the present invention.

Persons of ordinary skill in the art also will understand that methods in accordance with this invention may be implemented in the form of computer-executable instructions, such as software modules, that may be executed by a computer device. Such software modules may include routines, programs, objects, components, data structures, etc. that perform tasks or implement particular abstract data types. Persons of ordinary skill in the art further will recognize that methods and apparatus in accordance with this invention may be implemented using steps or devices other than those shown and discussed above. All such modifications are within the scope of the present invention, which is limited only by the claims that follow.

The invention claimed is:

1. An apparatus for processing input CMYK color data comprising a computer memory having stored thereon computer-executable instructions that, when executed by a computer device, configure the computer device to:
   convert input color data to first color data;
   process the first color data to provide second color data;
   convert the second color data to third color data using an output profile that comprises an implied gray component replacement level;
   estimate a gray component replacement level of the input color data;
   estimate the gray component replacement level implied by the output profile;
   combine the estimated gray component replacement levels;
   determine a black value based on the combined gray component replacement level; and
   use the determined black value and the second color data to determine output color data that has a gray component replacement level that substantially matches the gray component replacement level of the input color data.

2. The apparatus of claim 1, wherein the first color data are device-independent color data.

3. The apparatus of claim 1, wherein the computer-executable instructions further configure said computer device to process the first color data in a device-independent color space.

4. The apparatus of claim 1, wherein the third color data are device-dependent color data.

5. The apparatus of claim 1, wherein the output profile comprises a lookup table.

6. The apparatus of claim 1, wherein the input color data comprises CMYK data that approximates a spot color.

7. The apparatus of claim 1, wherein the computer-executable instructions further configure said computer device to tint the first color data.

8. An apparatus for processing input CMYK color data, comprising a computer memory having stored thereon computer-executable instructions that, when executed by a computer device, configure the computer device to:
   convert the input color data to a device-independent color space;
   process the converted data in the device-independent color space;
   convert the processed data to a device-dependent color space using an output profile;
   estimate a gray component replacement level of the input color data;
   estimate a gray component replacement level implied by the output profile;
   combine the gray component replacement levels;
   determine a black value based on the combined gray component replacement level; and
   use the determined black value and the processed data to determine output color data that has a gray component replacement level that substantially matches the gray component replacement level of the input color data.

9. The apparatus of claim 8, wherein the device-independent color space is a CIELAB color space.

10. The apparatus of claim 8, wherein the computer-executable instructions further configure said computer device to tint the converted data in the device-independent color space.

11. The apparatus of claim 8, wherein estimating the gray component replacement level of the input color data comprises determining a lightness level of a black-only component of the input color data.

12. The apparatus of claim 8, wherein the computer-executable instructions further configure said computer device to estimate the gray component replacement level implied by the output profile by determining a lightness level of a black-only component of the converted processed data.

13. An apparatus for processing input CMYK color data comprising a computer memory having stored thereon computer-executable instructions that, when executed by a computer device, configure the computer device to:
   convert the input color data to first color data;
   tint the converted data to provide second color data;
   convert the second color data to third color data using an output profile;
   determine a first lightness component that corresponds to a black-only component of the input color data;
   determine a second lightness component that corresponds to a black-only component of the third color data;

blend the first and second lightness components to provide a blended lightness level;

determine a black output component based on the blended lightness level; and use the black output component and the second color data to determine output color data that has a gray component replacement level that substantially matches a gray component replacement level of the input color data.

14. The apparatus of claim 13, wherein the output profile comprises a forward lookup table that associates CMYK data with L*a*b* data.

15. The apparatus of claim 14, wherein the computer-executable instructions further configure said computer device to determine the first lightness component by determining an L* component from the forward table that is associated with the black-only component of the input color data.

16. The apparatus of claim 14, wherein the computer-executable instructions further configure said computer device to determine the second lightness component by determining an L* component from the forward table that is associated with the black-only component of the third color data.

17. The apparatus of claim 14, wherein the computer-executable instructions further configure said computer device to determine output color data by fixing the black output component and determining output CMY components from the forward table.

18. The apparatus of claim 13, wherein the output profile comprises a reverse lookup table that associates L*a*b* data with CMYK data.

19. The apparatus of claim 14, wherein the computer-executable instructions further configure said computer device to determine the black output component by determining a black component from a reverse table that is associated with the blended lightness level.

* * * * *

UNITED STATES PATENT AND TRADEMARK OFFICE
CERTIFICATE OF CORRECTION

PATENT NO.        : 7,729,014 B2                                      Page 1 of 1
APPLICATION NO. : 11/840926
DATED             : June 1, 2010
INVENTOR(S)       : Richard A. Falk et al.

It is certified that error appears in the above-identified patent and that said Letters Patent is hereby corrected as shown below:

On the Title page, in field (75), in column 1, under "Inventors", line 1, delete "Richard" and insert -- Richard A. --, therefor.

In column 1, line 48, delete "calorimetric" and insert -- colorimetric --, therefor.

In column 1, line 62, delete "Comission" and insert -- Commission --, therefor.

In column 3, line 30-31, delete "calorimetrically" and insert -- colorimetrically --, therefor.

In column 8, line 20, in claim 8, delete "data," and insert -- data --, therefor.

Signed and Sealed this

Twelfth Day of October, 2010

David J. Kappos
*Director of the United States Patent and Trademark Office*